United States Patent [19]
Alvarez et al.

[11] Patent Number: 5,880,194
[45] Date of Patent: Mar. 9, 1999

[54] FIREWALL SEALANT

[75] Inventors: Khristopher E. Alvarez; Ann W. Norris; Michael J. Watson, all of Midland, Mich.

[73] Assignee: Dow Corning Corporation, Midland, Mich.

[21] Appl. No.: 926,107

[22] Filed: Sep. 9, 1997

[51] Int. Cl.$^6$ ....................................................... C08K 3/40
[52] U.S. Cl. ........................... 524/400; 524/443; 524/456; 524/492; 524/588; 524/701; 524/789; 524/847
[58] Field of Search ...................................... 524/400, 443, 524/456, 492, 588, 701, 789, 847

[56] References Cited

U.S. PATENT DOCUMENTS 2,684,349  7/1954  Whelton ...................................... 260/37

*Primary Examiner*—Margaret W. Glass
*Attorney, Agent, or Firm*—Larry A. Milco

[57] ABSTRACT

A curable composition which contains an alkenyl group containing polyorganosiloxane, an organosilicon compound having two silicon-bonded hydrogen atoms, a hydrosilylation reaction catalyst, and a glass frit, which is suitable, upon cure, for use as a firewall sealant.

15 Claims, No Drawings

FIREWALL SEALANT

BACKGROUND OF THE INVENTION

1. Field of the Invention

This invention relates to organosiloxane compositions that are curable to form organosiloxane elastomers. More particularly this invention relates to hydrosilylation reaction curable organosiloxane compositions that are curable to form organosiloxane elastomers which are useable as firewall sealants.

2. Description of the Related Art

The prior art describes organosiloxane compositions that cure to yield crosslinked elastomers and other useful products by the reaction of polyorganosiloxanes containing at least two alkenyl groups per molecule with organosilicon compounds containing at least two silicon bonded hydrogen atoms per molecule as the crosslinker. This reaction is typically catalyzed by platinum compounds. The reactive ingredients of these compositions are typically packaged in two containers with the crosslinker in one container and the hydrosilylation reaction catalyst in a second container. The curing reaction occurs when the contents of the two containers are mixed.

In U.S. Pat. No. 2,684,349, which issued on Jul. 20, 1954, Welton discloses a composition comprising a heat-convertible organopolysiloxane in which the organic groups are alkyl, aryl, aralkyl or halogenated aryl radicals and at least 5% of a finely divided glass frit filler. The present inventors discovered that organosiloxane compositions containing glass frits and polyorganosiloxanes, having an average of at least two organic groups which are alkenyl groups, yield elastomers having unexpectedly improved fire resistance properties. The compositions of the present invention are useful in sealing firewall constructions to prevent the passage of flames and air and other vapors.

SUMMARY OF THE INVENTION

The present invention is based on the discovery that adding a glass frit to a hydrosilylation reaction curable organosiloxane composition unexpectedly improves the ability of the resulting sealant to maintain its physical integrity and adhesion to various substrates despite being subject to the application of high temperature flames for an extended period of time. The present invention relates to a hydrosilylation reaction curable organosiloxane composition comprising A) 100 parts by weight of a polyorganosiloxane having an average of at least two silicon-bonded alkenyl groups per molecule;

B) an organosilicon compound having an average of at least two silicon-bonded hydrogen atoms per molecule;

C) a hydrosilylation reaction catalyst, wherein the concentration of hydrosilylation reaction catalyst is sufficient to promote curing of the organosiloxane composition; and D) at least 20 parts by weight per 100 parts by weight of Component (A), of a glass frit; wherein the sum of the average number of silicon-bonded alkenyl groups in Component (A) and the average number of silicon-bonded hydrogen atoms per molecule in Component (B) is greater than 4.

DETAILED DESCRIPTION OF THE INVENTION

This invention provides a hydrosilylation reaction curable organosiloxane composition comprising A) 100 parts by weight of a polyorganosiloxane having an average of at least two silicon-bonded alkenyl groups per molecule;

B) an organosilicon compound having an average of at least two silicon-bonded hydrogen atoms per molecule;

C) a hydrosilylation reaction catalyst, in an amount sufficient to accelerate the curing of the organosiloxane composition; and D) at least 20 parts by weight per 100 parts by weight of Component (A), of a glass frit; wherein the sum of the average number of silicon-bonded alkenyl groups in Component (A) and the average number of silicon-bonded hydrogen atoms per molecule in Component (B) is greater than 4.

The Alkenyl-Containing Polyorganosiloxane—Component (A)

Component (A) is an polyorganosiloxane containing an average of at least two alkenyl groups per molecule. It is the major component of the hydrosilylation reaction curable composition of the present invention. In order for this composition to properly crosslink, Component (A) must contain an average of at least two alkenyl groups per molecule. In preferred embodiments, Component (A) contains alkenyl groups having from 2 to 12 carbon atoms. Preferred alkenyl groups are represented by the formula $-R^1CH=CH_2$, where $R^1$ represents a single bond or an alkylene group containing from 2 to 10 carbon atoms. The alkylene group can be linear or branched. Examples of preferred alkenyl groups include but are not limited to vinyl, 2-propenyl, 3-butenyl, 5-hexenyl, 7-octenyl and 10-undecenyl. More preferred alkenyl groups are vinyl and hexenyl. In preferred embodiments, at least one alkenyl group is located at the terminal of the molecule chain. In more preferred embodiments, at least two alkenyl groups are located at two of the terminals of the molecular chain.

In preferred embodiments, Component (A) is represented by the general formula:

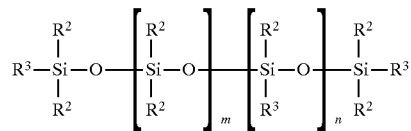

wherein each $R^2$ is individually selected from the group consisting of unsubstituted and substituted monovalent hydrocarbon groups containing from 1 to 20 carbon atoms; $R^3$ is $R^2$ or an alkenyl group; $m \geq 0$; and the value of n is selected such that Component (A) has an average of at least two alkenyl groups per molecule. Preferred alkenyl groups are vinyl and hexenyl. Preferably, when $R^2$ is an unsubstituted monovalent hydrocarbon group having less than 7 carbon atoms or a halogenated alkyl group having less than 7 carbon atoms. More preferably $R^2$ is alkyl group, such as methyl or ethyl, a cycloalkyl group such as cyclohexyl, an aryl group, such as phenyl, or a halogenated alkyl group, such as chloromethyl, 3-chloropropyl or 3,3,3-trifluoropropyl. Most preferably, $R^2$ is methyl. In preferred embodiments, n is zero.

Generally the siloxane is polymerized to a viscosity of from 0.03 to 500 Pa.s at 25° C., preferably from 2 to 250 Pa.s. It is possible to use either higher or lower viscosity polymers.

The polyorganosiloxane of the present invention may be a homopolymer, or a copolymer. A single polyorganosiloxane can be used or a mixture of different polyorganosiloxanes.

Methods for preparing the polyorganosiloxanes of Component (A) are sufficiently disclosed in the patent and other literature such that a detailed description in this specification is not necessary.

The Organohydrogensiloxane—Component (B)

Component (B) of the present invention is an organohydrogensiloxane containing an average of at least two silicon-bonded hydrogen atoms per molecule. It is used to crosslink the composition of the present invention. The silicon-bonded hydrogen atoms in Component (B) react with the alkenyl groups in Component (A) in order to cure the composition of the present invention. In order for the composition of the present invention to cure to a silicone elastomer, the sum of the average number of silicon-bonded alkenyl groups per molecule in Component (A) and the average number of silicon-bonded hydrogen atoms per molecule in Component (B) must be greater than 4.

Organohydrogensiloxanes that may be used as Component (B) preferably contain an average of more than two silicon-bonded hydrogen atoms per molecule, and more preferably contain an average of at least three silicon-bonded hydrogen atoms per molecule. The remaining valances on the silicon atoms are satisfied with organic groups selected from alkyl groups having less than 7 carbon atoms, halogenated alkyl groups having less than 7 carbon atoms and aryl groups. The preferred aryl group is phenyl. Preferred alkyl groups are methyl, ethyl, and hexyl. Most preferred alkyl groups are methyl groups. The preferred halogenated alkyl group is 3,3,3,-trifluoropropyl.

The organohydrogensiloxane of Component (B) can have a linear or branched structure, and can be a homopolymer, a copolymer, or a mixture of these types of polymers.

Polymers that are suitable for use as Component (B) include, but are not limited to, polymethylhydrogensiloxane, trimethylsiloxy-terminated polymethylhydrogensiloxane, copolymers of dimethylsiloxane, methylhydrogensiloxane and trimethylsiloxane units and copolymers of dimethylsiloxane, methylhydrogensiloxane and dimethylhydrogensiloxane units.

A preferred linear type of organohydrogensiloxane has a viscosity of from 0.01 to 10 Pa.s at 25° C. and comprises dialkylsiloxane and alkylhydrogensiloxane units with trialkylsiloxy terminal units. The alkyl groups contain from 1 to 4 carbon atoms and are most preferably methyl.

The amount of Component (B) used should be sufficient to provide the desired degree of crosslinking during cure. Generally, the proportion of Component (B) in the composition of the present invention is an amount ranging from 0.5 to 40 parts by weight per 100 parts of Component (A). In preferred embodiments, Component (B) is present in an amount ranging from 0.5 to 10 parts per 100 parts of Component (A). In more preferred embodiments, Component (B) is present in an amount ranging from 0.5 to 2 parts per 100 parts of Component (A).

The molar ratio of silicon-bonded hydrogen atoms to vinyl or other ethylenically unsaturated hydrocarbon groups in compositions curable by a hydrosilylation reaction is important with respect to the properties of the cured elastomer. The optimum ratio for the present curable compositions will be determined at least in part by the molecular weight of the polyorganosiloxane and the type of crosslinking agent. The relative concentration of organohydrogensiloxane (Component (B)) and polyorganosiloxane (Component (A)) in the composition of the present invention is equivalent to a molar ratio of silicon-bonded hydrogen atoms to alkenyl radicals that is typically from 0.3:1 to 2:1, preferably from 1:1 to 2:1.

The Hydrosilylation Reaction Catalyst—Component (C)

Component (C) is a metal from the platinum group of the periodic table or a compound of such a metal. These metals include platinum, palladium and rhodium. Platinum and platinum compounds are preferred based on the high activity level of these catalysts in hydrosilylation reactions. Catalysts that may be used as Component (C) in the organosiloxane composition of the present invention are any of the known forms that are effective in promoting the reaction of SiH groups with silicon-bonded alkenyl groups.

Suitable forms of platinum include but are not limited to chloroplatinic acid, platinum compounds and complexes of platinum compounds with unsaturated organic compounds or with siloxanes having silicon-bonded groups containing ethylenically unsaturated groups. Additional examples of suitable platinum catalysts include complexes of platinous halides or chloroplatinic acid with divinyltetramethyldisiloxane and tetramethyldisiloxane. Suitable platinum catalysts are described in U.S. Pat. No. 3,419,593, which issued on Dec. 31, 1968, and which is incorporated herein by reference for what it teaches about the preparation of such catalysts.

The concentration of Component (C) in the present composition is equivalent to a platinum concentration of from 0.1 to 10,000 parts by weight of platinum metal, preferably from 1000 to 10,000 parts by weight of platinum metal, and more preferably 2500 to 7500 parts by weight of platinum metal, per million parts (ppm), based on the combined weights of Components (A) and (B).

The Glass Frit (Component (D))

Component (D) of the present invention is a glass frit. The glass frit of the present invention is preferably a borosilicate frit. The preferred borosilicate frit is a calcium borosilicate frit. In addition to $B_2O_3$, $SiO_2$ and CaO, the calcium borosilicate frit of the present invention may contain minor amounts, not to exceed 20%, of $Al_2O_3$, MgO, LiO, $K_2O$, $Na_2O$, BaO, ZnO or $ZrO_2$. The most preferred calcium borosilicate frit contains at least 40% by weight of CaO, 20% by weight of $B_2O_3$, and at least 20% by weight of $SiO_2$. In preferred embodiments, the composition of the present invention contains a glass frit having a flow fusion point of at least about 1750° F. (954° C.).

The preparation of glass frits is well known and consists, for example, of melting together the constituents of the glass in the form of the oxides of the constituents and pouring such molten composition into water to form the frit. The frit produced by this method can then be milled to reduce the particle size of the frit and to obtain a frit with a more uniform size.

In preferred embodiments, the composition of the present inventions contains at least 20 parts by weight per 100 parts by weight of Component (A), of a glass frit. More preferably, the composition contains 20 to 50 weight % glass frit. Most preferably the composition contains from 20 to about 40 weight % glass frit.

Optional Components

Compositions of the present invention may contain additional ingredients to modify the properties of the curable compositions or cured materials prepared using the compositions. These additional ingredients include but are not limited to liquid diluents, reinforcing fillers such as finely divided silica of the fumed or precipitated type, non-reinforcing fillers such as quartz and calcium carbonate, surfactants, stabilizers to inhibit degradation in the presence of heat and/or ultraviolet light, dyes, pigments, and working time extenders and flame retardants. Non-reactive polyorganosiloxanes are a preferred class of diluents. The preferred non-reactive polyorganosiloxane diluent is trimethylsiloxy-terminated dimethylsiloxane. Compositions of the present invention may also contain small amounts of water.

In preferred embodiments, the composition of the present invention contains titanium dioxide, propyl orthosilicate and an adhesion promoter.

Preparation and Curing of Curable Compositions

The curable compositions of this invention are prepared by blending all of the components together. Curing begins when Component (A) is mixed with Component (B) in the presence of the hydrosilylation reaction catalyst. Complete cure requires from several minutes to several hours, depending upon, among other things, the type and concentration of crosslinker and the type and concentration of catalyst. The cure of the composition can be accelerated by heating the composition.

When the composition of the composition of the present invention is in the form of a two or more part systems, the composition is prepared by preparing a Part A and a Part B and then mixing Part A and Part B. Curing begins when Part A and Part B are mixed. When the curable compositions of the present invention are prepared using a Part A and a Part B, the mix ratio can vary, depending upon the formulation of each part, from about 1:1 to about 40:1, parts base per part curing agent. Typical mix ratios are 1:1, 10:1 and 20:1.

The present invention also relates to a multi-part system comprising:

A) 100 parts by weight of a polyorganosiloxane having an average of at least two silicon-bonded alkenyl groups per molecule;

B) an organosilicon compound having an average of at least two silicon-bonded hydrogen atoms per molecule;

C) a hydrosilylation reaction catalyst, in an amount sufficient to accelerate the curing of the organosiloxane composition; and D) at least 20 parts by weight per 100 parts by weight of Component (A), of a glass frit; wherein the sum of the average number of silicon-bonded alkenyl groups in Component (A) and the average number of silicon-bonded hydrogen atoms per molecule in Component (B) is greater than 4; with the proviso that Component (B) and Component (C) are in different parts.

The part which contains Component (C) is typically referred to as Part A. The part which contains Component (B) is typically referred to as Part B. Components (C) and (D) and any optional components may be contained in either Part A or Part B; or in both Part A and Part B.

Sealants and elastomers prepared using the present compositions are suitable for use as sealants in fire wall constructions. The compositions of the present invention are particularly suited for use in fire walls used on airplanes.

EXAMPLES

The following examples describe preferred curable compositions of the present invention, and should not be interpreted as limiting the invention defined in the accompanying claims. Unless otherwise indicated all parts and percentages in the examples are by weight and viscosities are the values measured at 25° C..

For each of Comparative Examples 1–5 and Examples 1–3, a silicone sealant was prepared by first preparing an organosiloxane composition. Each organosiloxane composition was prepared by admixing 10 parts of Part A and 10 parts of Part B. Each Part A was prepared by admixing the listed components. Each Part B was prepared by admixing the listed components.

For Comparative Example 1 and Examples 1 and 2, the self extinguishing, burn through and physical integrity of each composition was evaluated by first curing the each composition for 30 minutes at 150° C.. Test specimens were prepared as follows. A 2 inch by 4 by ¼ inch (2.25 cm×10.2 cm×0.64 cm) sample of the composition was cured on the face of a 6 inch by 6 inch by ¼ inch (15.2 cm×15.2 cm×0.64 cm) stainless steel plate. The plate had a 3.5 inch by ¼ inch (8.9 cm×0.64 cm) slot in the center.

For Comparative Examples 2–5 and Example 3, the self extinguishing, burn through and physical integrity of each composition was evaluated by first curing the each composition for 30 minutes at 150° C. Test specimens were prepared as follows. Part A and Part B were mixed using a static mixer and dispenses onto the face of a 6 inch by 6 inch by ¼ inch (15.2 cm×15.2 cm×0.64 cm) stainless steel plate with a having 3.5 inch by ¼ inch (8.9 cm×0.64 cm) slot in the center in the center of the plate. A sample of the composition was drawn over the plate with a die and cured. The die had a half circle cut out having a diameter of 0.75 inches (1.9 cm) and a depth of 0.25 inches (0.64 cm). The sample was cured for 2 days at room temperature.

For each of the Comparative Examples and the Examples, the stainless steel plate was adjustably secured approximately 2 inches above a bunsen burner, with the face of the stainless steel containing the cured composition plate positioned at a 45° angle to the flame source. A flame was applied to the cured composition for 15 seconds and then pulled away. The distant between the flame and the face of the stainless steel plate was adjusted so that the surface temperature of the cured composition was at least 2000° F. The flame was then reapplied to the cured composition for an additional 15 minutes. The cured composition was then evaluated, via visual inspection, for burn-through, and physical integrity and adhesion to the stainless steel plate. The self extinguishing time was also recorded. The results are reported on Table I.

Comparative Example 1

Part A 79.2 parts dimethlyvinylsiloxy-terminated dimethylsiloxane with a viscosity of approximately 55,000 mm$^2$/s.

14.9 parts of hexamethyldisilazane treated filler 5 parts dimethylhexenylsiloxy-terminated dimethylsiloxane-methylhexenylsiloxane copolymer having a viscosity of approximately 420 mm$^2$/s.

0.3 parts of a chloroplatinic acid complex of divinyltetramethyldisiloxanediluted with dimethylvinylsiloxy endblocked polydimethylsiloxane to provide 0.65 weight percent platinum 0.2 parts tetrabutyl titanate 0.2 parts of a mixture of 89 weight % of titanium dioxide, 5 weight % of amorphous silica and 5 weight % of alumina hydrate 0.15 parts trimethylolpropane dially ether 0.04 parts of a mixture of 60% by weight of trimethylsiloxy terminated dimethyl siloxane and 40% by weight of carbon black Part B 94.9 parts of a mixture comprising 79.8 weight % of dimethlyvinylsiloxy-terminated dimethylsiloxane with a viscosity of approximately 55,000 mm$^2$/s; 15 weight % of hexamethyldisilazane treated filler; 5 weight % of dimethylhexenylsiloxy-terminated dimethylsiloxane-methylhexenylsiloxane copolymer having a viscosity of approximately 420 mm$^2$/s; and 0.2 weight % of a mixture of 89 weight % of titanium dioxide, 5 weight % of amorphous silica and 5 weight % of alumina hydrate 2.35 parts of tetrapropyl othosilicate 2.25 parts of a trimethylsiloxy-terminated polydiorganosiloxane having an average of five methylhydrogensiloxane units and three dimethylsiloxane units per molecule with a silicon-bonded hydrogen atom content of about 0.75 weight percent 0.5 parts of glycidoxypropyltrimethoxysilane 0.02 parts of a mixture containing 97% by weight of dimethylvinylsiloxy-terminated dimethylsiloxane-methylvinylsiloxane copolymer and 3% by weight of ethynyl cyclohexanol Comparative Example 2

Part A 78.1 parts of a mixture comprising 79.8 weight % of dimethlyvinylsiloxy-terminated dimethylsiloxane with a viscosity of approximately 55000 mm$^2$/s; 15 weight % of hexamethyldisilazane treated filler; 5 weight % of dimethylhexenylsiloxy-terminated dimethylsiloxane-methylhexenylsiloxane copolymer having a viscosity of approximately 420 mm$^2$/s; and 0.2 weight % of a mixture of 89 weight % of titanium dioxide, 5 weight % of amorphous silica and 5 weight % of alumina hydrate 20 parts of alumina trihydrate 0.9 parts of parts of a chloroplatinic acid complex of divinyltetramethyldisiloxane diluted with dimethylvinylsiloxy endblocked polydimethylsiloxane to provide 0.65 weight percent platinum 1 part of fumed silica having a surface average of 90 m$^2$/g Part B 78.9 parts of a mixture comprising 79.8 weight % of dimethlyvinylsiloxy-terminated dimethylsiloxane with a viscosity of approximately 55000 mm$^2$/s; 15 weight % of hexamethyldisilazane treated filler; 5 weight % of dimethylhexenylsiloxy-terminated dimethylsiloxane-methylhexenylsiloxane copolymer having a viscosity of approximately 420 mm$^2$/s; and 0.2 weight % of a mixture of 89 weight % of titanium dioxide, 5 weight % of amorphous silica and 5 weight % of alumina hydrate 20 parts of alumina trihydrate 1 part of fumed silica having a surface average of 90 m$^2$/g 0.03 parts of ethynyl cyclohexanol Comparative Example 3

Part A 10 parts of Part A of Comparative Example 1

2 parts of Mg(OH)2

Part B 10 parts of Part B of Comparative Example 1

Comparative Example 4

Part A 100 parts of Part A of Comparative Example 1

Part B 79 parts of a mixture comprising 79.8 weight % of dimethlyvinylsiloxy-terminated dimethylsiloxane with a viscosity of approximately 55000 mm$^2$/s; 15 weight % of hexamethyldisilazane treated filler; 5 weight % of dimethylhexenylsiloxy-terminated dimethylsiloxane-methylhexenylsiloxane copolymer having a viscosity of approximately 420 mm$^2$/s; and 0.2 weight % of a mixture of 89 weight % of titanium dioxide, 5 weight % of amorphous silica and 5 weight % of alumina hydrate 1 part of fumed silica having a surface average of 90 m$^2$/g 20 parts of Mg(OH)$_2$ 0.03 part of ethynyl cyclohexanol Comparative Example 5

Part A 78.1 parts of Part A of Comparative Example 1

20 parts of Al$_2$(SO$_4$)$_3$.n(H$_2$O) where n is 12–14

1 part fumed silica having a surface average of 90 m$^2$/g 0.9 parts of parts of a chloroplatinic acid complex of divinyltetramethyldisiloxane-diluted with dimethylvinylsiloxy endblocked polydimethylsiloxane to provide 0.65 weight percent platinum Part B 79 Parts of Part B of Comparative Example 1

20 parts of Al$_2$(SO$_4$)$_3$.n(H$_2$O) where n is 12–14

1 part of fumed silica having a surface average of 90 m$^2$/g 0.03 parts of ethynyl cyclohexanol Example 1

Part A 6 parts of Part A of Comparative Example 1

4 parts of a calcium borosilicate glass having a flow fusion temperature of 1750° F. (954° C.) and containing 28.2 weight % B$_2$O$_3$, 26.8 weight % SiO$_2$ and 45 weight % CaO.

Part B 10 parts of Part B of Comparative Example 1

Example 2

Part A 6 parts of Part A of Comparative Example 1

4 of a calcium borosilicate glass containing 30.3 weight % B$_2$O$_3$, 43.3 weight % SiO$_2$, 13.8 weight % of Al$_2$O$_3$ and 4.1 weight % CaO.

Part B 10 parts of Part B of Comparative Example 1

Example 3

Part A 58.1 part of Part A of Comparative Example 1

40 parts a calcium borosilicate glass having a flow fusion temperature of 1750° F. (954° C.) and containing 28.2 weight % B$_2$O$_3$, 26.8 weight % SiO$_2$ and 45 weight % CaO.

1 part fumed silica having a surface average of 90 m$^2$/g 0.9 parts of parts of a chloroplatinic acid complex of divinyltetramethyldisiloxane-diluted with dimethylvinylsiloxy endblocked polydimethylsiloxane to provide 0.65 weight percent platinum Part B 58.7 parts of Part B of Comparative Example 1

40 parts of a calcium borosilicate glass having a flow fusion temperature of 1750° F. (954° C.) and containing 28.2 weight % B$_2$O$_3$, 26.8 weight % SiO$_2$ and 45 weight % CaO.

1 part of fumed silica having a surface average of 90 m$^2$/g 0.03 parts ethynyl cyclohexanol

TABLE I

| | Self Extinguish after 15 seconds | Self Extinguish after 15 minutes | Burn Through | Maintained Adhesion & Integrity |
|---|---|---|---|---|
| Example 1 | Yes | Yes | No | Yes |
| Example 2 | Yes | Yes, after 2.5 min. | No | Yes |
| Comp. Ex. 1 | Yes | Yes, after 2 min. | Yes | Yes |
| Comp. Ex. 3 | Yes | Yes, after 20 seconds | No | No |
| Comp. Ex. 4 | Yes | Yes, after 10 seconds | No | No |
| Comp. Ex. 5 | Yes | Yes | No | No |

That which is claimed is:

1. An organosiloxane composition, comprising:

A) 100 parts by weight of a polyorganosiloxane having an average of at least two silicon-bonded alkenyl groups per molecule;

B) an organosilicon compound having an average of at least two silicon-bonded hydrogen atoms per molecule;

C) a hydrosilylation reaction catalyst, in an amount sufficient to accelerate the curing of the organosiloxane composition; and D) at least 20 parts by weight per 100 parts by weight of Component (A), of a glass frit having a flow fusion temperature of at least about 954° C.; wherein the sum of the average number of silicon-bonded alkenyl groups in Component (A) and the average number of silicon-bonded hydrogen atoms per molecule in Component (B) is greater than 4.

2. The composition of claim 1, wherein Component (B) is present in an amount from 0.5 to 40 parts by weight per 100 parts by weight of Component (A).

3. The composition of claim 2, wherein Component (B) is present in an amount from 0.5 to 10 parts by weight per 100 parts by weight of Component (A).

4. The composition of claim 3 wherein Component (B) is present in an amount from 0.5 to 2 parts by weight per 100 parts by weight of Component (A).

5. The composition of claim 1, wherein the molar ratio of silicon-bonded hydrogen atoms in Component (B) to silicon-bonded alkenyl groups in Component (A) is 0.3:1 to 2:1.

6. The composition of claim 5, wherein the molar ratio of silicon-bonded hydrogen atoms in Component (B) to silicon-bonded alkenyl groups in Component (A) is 1:1 to 2:1.

7. The composition of claim 1 wherein Component (C) is present in an amount from 2,500 to 7,500 parts by weight per million parts of the combined weights of Components (A) and (B).

8. The composition of claim 1, wherein Component (D) is a borosilicate frit.

9. The composition of claim 8, wherein Component (D) comprises $B_2O_3$, $SiO_2$ and CaO.

10. The composition of claim 9, wherein Component (D) comprises at least 20% by weight of $B_2O_3$, at least 20% by weight of $SiO_2$ and at least 40% by weight of CaO.

11. A product obtained by admixing:

A) 100 parts by weight of a polyorganosiloxane having an average of at least two silicon-bonded alkenyl groups per molecule;

B) an organosilicon compound having an average of at least two silicon-bonded hydrogen atoms per molecule;

C) a hydrosilylation reaction catalyst, in an amount sufficient to accelerate the curing of the organosiloxane composition; and D) at least 20 parts by weight per 100 parts by weight of Component (A), of a glass frit having a flow fusion temperature of at least about 954° C.; wherein the sum of the average number of silicon-bonded alkenyl groups in Component (A) and the average number of silicon-bonded hydrogen atoms per molecule in Component (B) is greater than 4.

12. The composition of claim 11, wherein Component (D) is a borosilicate frit.

13. The composition of claim 12, wherein Component (D) comprises $B_2O_3$, $SiO_2$ and CaO.

14. The composition of claim 13, wherein Component (D) comprises at least 20% by weight of $B_2O_3$, at least 20% by weight of $SiO_2$ and at least 40% by weight of CaO.

15. A multi-part composition, comprising:

A) 100 parts by weight of a polyorganosiloxane having an average of at least two silicon-bonded alkenyl groups per molecule;

B) an organosilicon compound having an average of at least two silicon-bonded hydrogen atoms per molecule;

C) a hydrosilylation reaction catalyst, in an amount sufficient to accelerate the curing of the organosiloxane composition; and D) at least 20 parts by weight per 100 parts by weight of Component (A), of a glass frit having a flow fusion temperature of at least about 954° C.; wherein the sum of the average number of silicon-bonded alkenyl groups in Component (A) and the average number of silicon-bonded hydrogen atoms per molecule in Component (B) is greater than 4; with the proviso that Component (B) and Component (C) are in different parts.

* * * * *